Aug. 3, 1943.　　J. S. NURNBERGER ET AL　　2,325,973

DRILL

Filed April 20, 1942

J. S. Nurnberger
L. G. Lankford
INVENTORS.

BY

Patented Aug. 3, 1943

2,325,973

UNITED STATES PATENT OFFICE 2,325,973

DRILL

Joseph Samuel Nurnberger and Lyle Gentry Lankford, St. Albans, W. Va.

Application April 20, 1942, Serial No. 439,770

5 Claims. (Cl. 77—68)

This invention relates to a drill designed primarily for use in the formation of deep holes such as the bores in rifle barrels. It is generally used where the work is rotated relative to the drill although obviously it could be used under other conditions.

An object of the invention is to provide a cutting tool having more than one point or cutting edge whereby greater cutting speed can be effected while at the same time the tool is subjected to less wear during the operation thereof.

A further object is to provide a drill which reduces the tendency of producing an elliptical bore instead of a cylindrical bore.

A still further object is to provide a tool which can readily be reground or reshaped on a standard drill grinder and which can be manufactured with the same equipment used in the manufacture of standard twist drills.

A still further object is to provide a drill having means for disposing freely of the chips or cuttings so that they will not clog or otherwise interfere with the operation of the tool.

Another object is to provide a means whereby a lubricant can be fed to the cutting end of the drill and used as a means for causing the chips to flow along the channel provided therefor.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Referring to the figures by characters of reference, 1 designates the body of the drill having spiral flutes 2 and 3. The flute 2 is extended approximately three-quarters around the body of the drill whereas the flute 3 makes a one-quarter turn. This latter flute merges into the lower end of a deep channel 4 extending longitudinally of the body and preferably V-shaped. The flute 2 opens at its upper end into one side of this channel 4.

Figure 1:
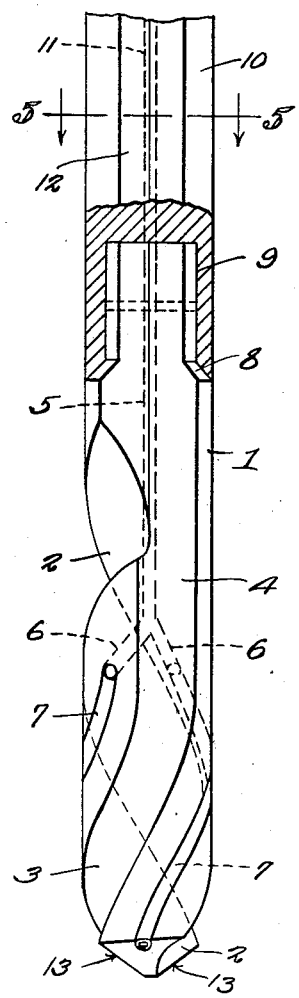
Figure 1 is a view partly in elevation and partly in section of the drill and a portion of the tubular rod to which it is connected.
Figure 2:
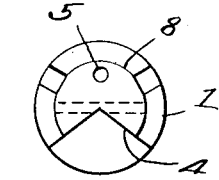
Figure 2 is a plan view of the upper end of the drill.
Figure 3:
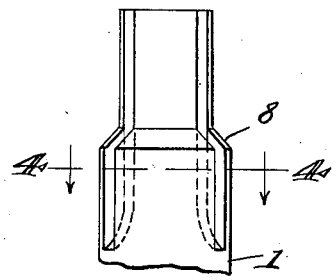
Figure 3 is an elevation of the upper or butt end of the drill showing that portion diametrically opposite the portion shown in Fig. 1.
Figure 4:
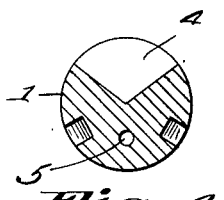
Figure 4 is a section on line 4—4, Figure 3.
Figure 5:
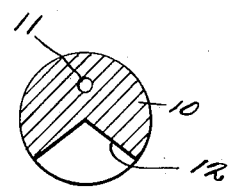
Figure 5 is a section on line 5—5, Figure 1.

A longitudinal bore 5 is formed in the body and is forked, as indicated at 6, each branch of the fork opening into a tube 7 seated in the drill between the flutes and extending to the cutting end of the drill as shown. Obviously instead of utilizing a tube for this purpose each branch 6 can be extended within the drill to the cutting end thereof. The upper or butt end of the drill body is reduced in size and formed with a shoulder as shown at 8 and this end is adapted to be seated in a socket 9 in one end of a rod 10 which, as illustrated in Figs. 1 and 5, has a bore 11 extending longitudinally therein and positioned to register with the end of bore 5 when the rod and bit are properly assembled. Rod 10 is also provided with a deep channel 12 corresponding with the channel 4 and adapted to register therewith.

The drill is adapted to be fastened to the socket end of the rod 10 in any suitable manner and during its operation both the rod and drill remain fixed relative to each other.

A lubricating medium is adapted to be forced along the registering bores 11 and 5 under pressure of from two hundred to four hundred pounds and, when it emerges at the cutting end of the drill, this oil operates to force the cuttings or chips back along the flutes 3 and 2 into the channel 4 and thence along said channel to the channel 12.

Obviously a twist drill such as herein described will act very efficiently in the production of long bores such as those found in rifle barrels and, by providing more than one cutting edge as well as the means whereby cuttings can be forced away from the cutting edges and outwardly from the hole by means of a lubricant under pressure, more accurate bores can be produced than otherwise. The cutting points or edges 13 can of course be readily reground or reshaped on a standard drill grinder and the clearances can be varied to suit the different materials and conditions encountered.

While the improvements are incorporated primarily in a twist drill, it is to be understood that they can also be combined with other tools such as reamers, end mills, etc.

What is claimed is:

1. A tool of the class described including a body having a cutting end and a butt end, separate spiral flutes extending different distances respectively about the body from the cutting end thereof toward the butt end, there being a deep longitudinal channel in the body extending from the butt end to the end of one of the flutes and communicating with the end of the other flute.

2. A tool of the class described including a body having a cutting end and a butt end, there being spiral flutes extending different distances respectively about the body from the cutting end thereof toward the butt end, and a deep longitudinal channel extending from the butt end of the body to one end of one of the flutes and communicating between its ends with one end of the other flute.

3. A tool of the class described including a body having a cutting end and a butt end, there being spiral flutes extending different distances respectively about the body from the cutting end thereof toward the butt end, and a deep longitudinal channel extending from the butt end of the body to one end of one of the flutes and communicating between its ends with one end of the other flute, there being a bore extending longitudinally within the body and having outlets at the cutting end of the body.

4. A tool of the class described including a body having a cutting end and a butt end, there being separate flutes extending from the cutting end of the body, one of the flutes being extended approximately one-quarter of the circumference of the body and the other flute being extended substantially three-quarters of the circumference of the body, there being a longitudinal channel in the body extending from the butt end thereof to one end of the first named flute, the other flute opening at one end into one side of the channel.

5. A tool of the class described including a body having a cutting end and a butt end, there being spiral flutes extending different distances respectively about the body from the cutting end thereof toward the butt end, and a deep longitudinal channel extending from the butt end of the body to one end of one of the flutes and communicating between its ends with one end of the other flute, there being a bore extending longitudinally within the body and having outlets at the cutting end of the body, an extension having a socket in which the butt end of the body is seated, there being a longitudinal channel in the extension registering with the channel in the body, and a longitudinal bore in the extension registering with the bore in the body.

JOSEPH SAMUEL NURNBERGER.
LYLE GENTRY LANKFORD.